(12) United States Patent (10) Patent No.: US 12,693,459 B2
Nishi et al. (45) Date of Patent: Jul. 28, 2026

(54) MIRROR COMPRISING A RIB HAVING A TAPERED SIDE SURFACE AND A WIDENED INLET

(71) Applicant: KYOCERA CORPORATION, Kyoto (JP)

(72) Inventors: Yuuki Nishi, Kirishima (JP); Kenichi Hamamura, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 891 days.

(21) Appl. No.: 17/780,771

(22) PCT Filed: Nov. 10, 2020

(86) PCT No.: PCT/JP2020/041977
§ 371 (c)(1),
(2) Date: May 27, 2022

(87) PCT Pub. No.: WO2021/106557
PCT Pub. Date: Jun. 3, 2021

(65) Prior Publication Data
US 2023/0036458 A1 Feb. 2, 2023

(30) Foreign Application Priority Data
Nov. 28, 2019 (JP) ................................. 2019-215322

(51) Int. Cl.
*G02B 5/10* (2006.01)
*G02B 7/18* (2021.01)
(52) U.S. Cl.
CPC *G02B 5/10* (2013.01); *G02B 7/18* (2013.01)
(58) Field of Classification Search
CPC ...................................................... G02B 23/02
See application file for complete search history.

(56) References Cited

U.S. PATENT DOCUMENTS

| | | | |
|---|---|---|---|
| 5,227,921 A | 7/1993 | Bleier et al. | |
| 5,565,052 A * | 10/1996 | Papenburg | C04B 37/001 |
| | | | 156/89.27 |
| 2012/0182636 A1 | 7/2012 | Seibert et al. | |
| 2018/0003867 A1 | 1/2018 | Mooney et al. | |
| 2022/0026668 A1* | 1/2022 | Hattori | B32B 15/14 |

FOREIGN PATENT DOCUMENTS

| | | |
|---|---|---|
| DE | 102011051198 A1 | 12/2012 |
| JP | 2005-234344 A | 9/2005 |
| JP | 2009205108 A * | 9/2009 |
| JP | 2009276378 A * | 11/2009 |
| JP | 2010243683 A * | 10/2010 |
| WO | 2015/038233 A1 | 3/2015 |

OTHER PUBLICATIONS

Geyl et al., "Progress toward a third Gemini M2 mirror", SAGEM Optronics & AirLand Systems—REOSC High Performance Optics, Proc of SPIE vol. 5869, pp. 586901-1 to 586901-4, Aug. 25, 2005, XP040207630, DOI: https://doi.org/10.1117/12.621500.

\* cited by examiner

*Primary Examiner* — Paul C Lee
(74) *Attorney, Agent, or Firm* — Procopio, Cory, Hargreaves & Savitch LLP

(57) ABSTRACT

A mirror (1) includes a mirror surface (3*a*) provided on a front surface (3) of a body portion (2), having a plate shape and made of ceramics, a recessed portion (6) formed on a back surface (4) of the body portion (2), and a rib (7) provided along edges of the recesses (6) and including a tapered side surface (7*a*1, 7*b*1, 7*c*1).

9 Claims, 22 Drawing Sheets

MIRROR COMPRISING A RIB HAVING A TAPERED SIDE SURFACE AND A WIDENED INLET

TECHNICAL FIELD

An embodiment of the present disclosure relates to a mirror.

BACKGROUND ART

An astronomical telescope or the like is provided with a mirror for reflecting light from an observation target. As such a mirror, for example, a mirror for an astronomical telescope including a mirror member having a reflecting surface for reflecting light and made of low thermal expansion ceramics and a reflecting film provided on the reflecting surface of such a mirror member is disclosed (see PTL 1).

CITATION LIST

Patent Literature

PTL 1: JP 2005-234344

SUMMARY OF INVENTION

A mirror according to an aspect of an embodiment includes a mirror surface provided on a front surface of a body portion, having a plate shape and made of ceramics, a recessed portion formed on a back surface of the body portion, and a rib provided along an edge of the recessed portion and including a tapered side surface.

DESCRIPTION OF EMBODIMENTS

Figure 1:
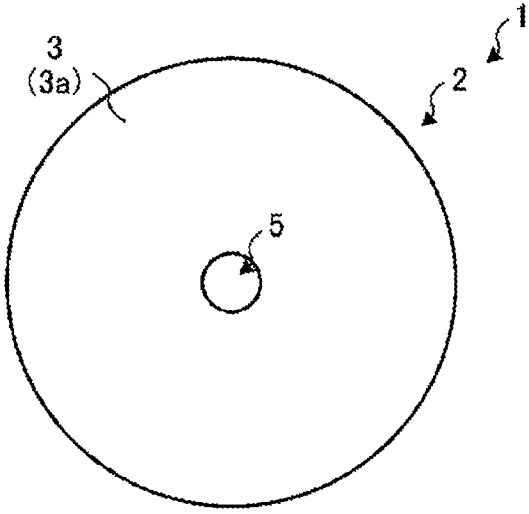
FIG. 1 is a plan view of a mirror according to an embodiment when viewed from a front surface side.

Hereinafter, embodiments of a mirror disclosed in the present disclosure will be described with reference to the accompanying drawings. Note that the present invention is not limited to the embodiments that will be described below. In each of the following embodiments, the same reference numerals are assigned to the same portions and redundant descriptions thereof will be omitted.

An astronomical telescope or the like is provided with a mirror for reflecting light from an observation target. As such a mirror, for example, a mirror for an astronomical telescope including a mirror member having a reflecting surface for reflecting light and made of low thermal expansion ceramics and a reflecting film provided on the reflecting surface of such a mirror member is disclosed.

However, in the related art, since a core member for reinforcing the mirror member is separately required, in a manufacturing process of a mirror, a step of manufacturing the core member, a step of bonding the mirror member and the core member, and the like are separately required. That is, in the related art, it is difficult to easily manufacture the mirror.

In this regard, it is expected to implement a mirror that can overcome the aforementioned problems and can be easily manufactured.

Configuration of Mirror

First, an overall configuration of a mirror 1 according to an embodiment will be described with reference to FIG. 1 to FIG. 3. FIG. 1 is a plan view of the mirror 1 according to the embodiment when viewed from a front surface 3 side, FIG. 2 is a plan view of the mirror 1 according to the embodiment when viewed from a back surface 4 side, and FIG. 3 is a cross-sectional view taken along line A-A in a direction of arrows in FIG. 2.

Although the mirror 1 used in an astronomical telescope will be described in the present disclosure, a device including the mirror 1 according to the embodiment applied thereto is not limited to the astronomical telescope.

Figure 2:
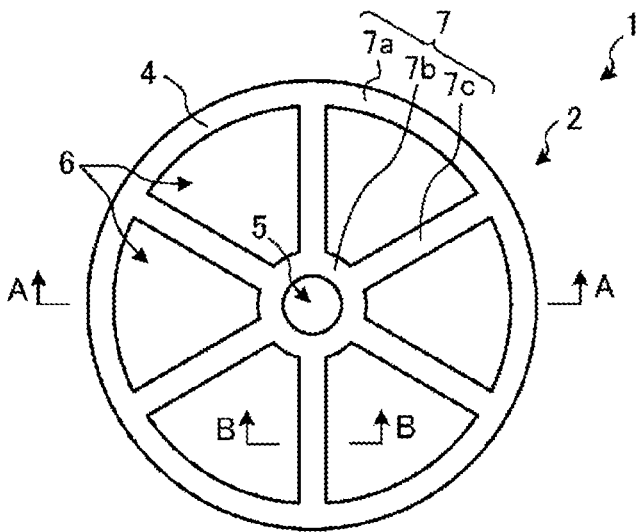
FIG. 2 is a plan view of a mirror according to the embodiment when viewed from a back surface side.
Figure 3:
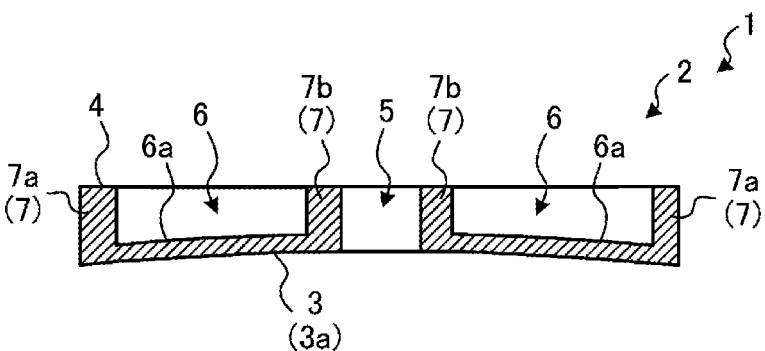
FIG. 3 is a cross-sectional view taken along line A-A in a direction of arrows illustrated in FIG. 2.

As illustrated in FIG. 1 to FIG. 3, the mirror 1 according to the embodiment includes a plate-shaped (disk-shaped in the present disclosure) body portion 2 made of ceramics. Such a body portion 2 is provided with a front surface 3 and a back surface 4. The front surface 3 has a curved (for example, spherical) mirror surface 3a on the entire surface thereof.

The mirror surface 3a is formed by, for example, mirror-polishing the front surface 3 entirely and then applying a coating that reflects light to such a mirror surface. The mirror 1 according to the embodiment can reflect light from an observation target on the mirror surface 3a.

The present disclosure describes a case where the mirror surface 3a has a recessed shape, but the shape of the mirror surface 3a is not limited to the recessed shape and may be a planar shape or a convex shape. Furthermore, the mirror surface 3a is not limited to a spherical surface, and may be an aspherical surface.

As illustrated in FIG. 3 and the like, the body portion 2 is formed in the center portion thereof with a cylindrical through hole 5 that penetrates from the front surface 3 to the back surface 4. In the astronomical telescope to which the mirror 1 is applied, light passing through such a through hole 5 can be observed by a sub-mirror.

As illustrated in FIG. 2 and the like, a plurality of recessed portions 6 are formed on the back surface 4 of the body portion 2. Such a recessed portion 6 has, for example, a fan shape having a center angle of about 60° in the plan view. On the back surface 4, six recessed portions 6 are equally disposed along the circumferential direction of the disk-shaped body portion 2.

Furthermore, a rib 7 is provided on the back surface 4 of the body portion 2 along edges of such recessed portions 6. As illustrated in FIG. 3, the rib 7 is provided to rise substantially perpendicular from the bottom surfaces 6a of the recessed portions 6 toward the back surface 4.

Furthermore, as illustrated in FIG. 2, the rib 7 includes an outer peripheral rib 7a provided on an outer peripheral side of the back surface 4, an inner peripheral rib 7b provided on an inner peripheral side of the back surface 4, and a connection rib 7c provided to connect the outer peripheral rib 7a and the inner peripheral rib 7b.

The outer peripheral rib 7a is provided along an outer edge portion of the back surface 4, for example. The inner peripheral rib 7b is provided between the through hole 5 and the recessed portions 6 to surround the through hole 5, for example. The connection rib 7c is provided radially from a center portion of the back surface 4 toward the outer edge portion of the back surface 4, for example.

In the embodiment, by forming the plurality of recessed portions 6 in the body portion 2, the volume of the mirror 1 can be reduced, so that the mirror 1 can be reduced in weight. Furthermore, in the embodiment, the rib 7 is formed along the edges of the recessed portions 6, so that the strength of the mirror 1 reduced in weight by the recessed portion 6 can be ensured.

Figure 4:
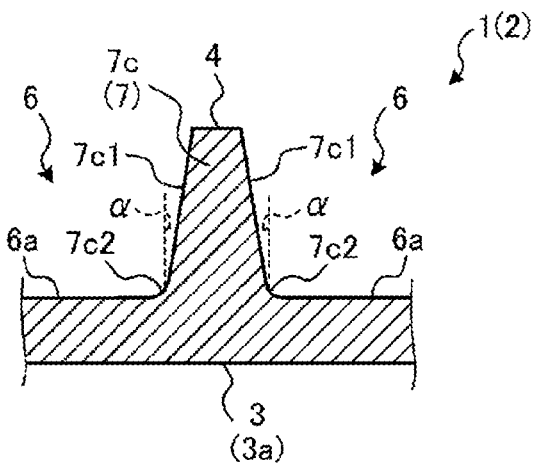
FIG. 4 is a cross-sectional view taken along line B-B in a direction of arrows illustrated in FIG. 2.

Subsequently, details of the rib 7 according to the embodiment will be described with reference to FIG. 4 to FIG. 7. FIG. 4 is a cross-sectional view taken along line B-B in a direction of arrows in FIG. 2, and is an enlarged cross-sectional view illustrating the configuration of the connection rib 7c according to the embodiment.

As illustrated in FIG. 4, the connection rib 7c according to the embodiment has tapered side surfaces 7c1. Such a side surface 7c1 is inclined with respect to the back surface 4 so that an inlet side of a recessed portion 6 in contact with the side surface 7c1 is widened. An inclination angle α of the side surface 7c1 is in the range of, for example, 1° to 5°, and is preferably in the range of 2° to 3°.

In the embodiment, the connection rib 7c has the tapered side surfaces 7c1, so that a molded article to be fired later to become the body portion 2 is molded with a mold, and then such a mold can be easily removed from the molded article in the manufacturing process of the mirror 1.

Consequently, according to the embodiment, the molded article to be the body portion 2 can be easily molded with the mold, so that the mirror 1 can be easily manufactured. Furthermore, in the embodiment, a distal end side of the connection rib 7c can be thinned, so that the mirror 1 can be reduced in weight.

Furthermore, in the embodiment, it is preferable that a corner portion 7c2 located at a lower end of the connection rib 7c has an R shape. Such a corner portion 7c2 is a portion where the side surface 7c1 of the connection rib 7c and the bottom surface 6a of the recessed portion 6 are in contact with each other.

In this way, since the corner portion 7c2 of the connection rib 7c has an R shape, stress can be suppressed from being concentrated on such a corner portion 7c2, so that the strength in the vicinity of the connection rib 7c in the body portion 2 can be improved.

As illustrated in FIG. 4, the side surfaces 7c1 on both sides of the connection ribs 7c may be tapered together. Accordingly, after the molded article to be the body portion 2 is molded with the mold, such a mold can be more easily removed from the molded article.

Figure 5:
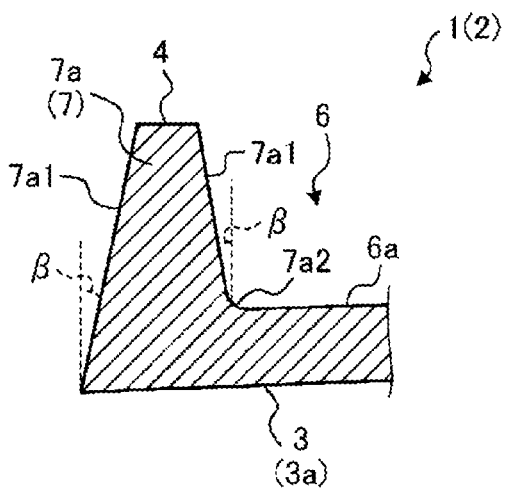
FIG. 5 is an enlarged cross-sectional view illustrating the configuration of an outer peripheral rib according to the embodiment.

FIG. 5 is an enlarged cross-sectional view illustrating the configuration of the outer peripheral rib 7a according to the embodiment. As illustrated in FIG. 5, the outer peripheral rib 7a according to the embodiment has tapered side surfaces 7a1. Of the side surfaces 7a1 on both sides, a side surface 7a1 in contact with the recessed portion 6 is inclined with respect to the back surface 4 so that the inlet side of such a recessed portion 6 is widened.

Furthermore, of the side surfaces 7a1 on both sides, a side surface 7a1 to be the side surface of the body portion 2 on the outer peripheral side is inclined with respect to the back surface 4 so that the back surface 4 side is closer to the center of the body portion 2 than the front surface 3 side. An inclination angle β of the side surface 7a1 is in the range of, for example, 1° to 5°, and is preferably in the range of 2° to 3°.

In the embodiment, the outer peripheral rib 7a has the tapered side surface 7a1, so that the molded article to be fired later to become the body portion 2 is molded with the mold, and then such a mold can be easily removed from the molded article in the manufacturing process of the mirror 1.

Consequently, according to the embodiment, the molded article to be the body portion 2 can be easily molded with the mold, so that the mirror 1 can be easily manufactured. Furthermore, in the embodiment, a distal end side of the outer peripheral rib 7a can be thinned, so that the mirror 1 can be reduced in weight.

Furthermore, in the embodiment, it is preferable that the corner portion 7a2 located at a lower end of the outer peripheral rib 7a has an R shape. Such a corner portion 7a2 is a portion where the side surface 7a1 of the outer peripheral rib 7a and the bottom surface 6a of the recessed portion 6 are in contact with each other.

In this way, since the corner portion 7a2 of the outer peripheral rib 7a has an R shape, stress can be suppressed from being concentrated on the corner portion 7a2, so that the strength in the vicinity of the outer peripheral rib 7a in the body portion 2 can be improved.

Figure 6:
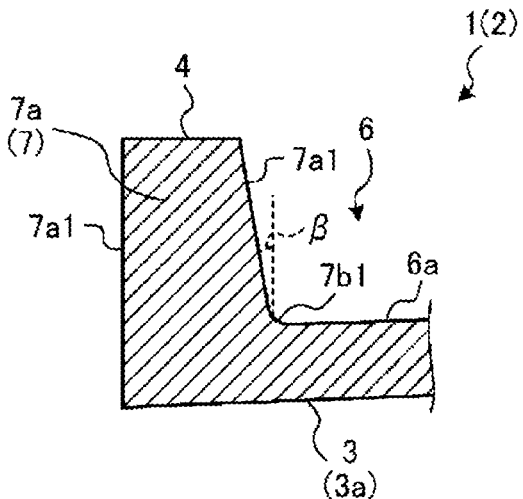
FIG. 6 is an enlarged cross-sectional view illustrating another configuration of an outer peripheral rib according to the embodiment.

The side surfaces 7a1 on both sides of the outer peripheral rib 7a may be tapered together as illustrated in FIG. 5, or only a side surface 7a1 in contact with the recessed portion 6 may be tapered as illustrated in FIG. 6. FIG. 6 is an enlarged cross-sectional view illustrating another configuration of the outer peripheral rib 7a according to the embodiment.

As illustrated in FIG. 5, by making both side surfaces 7a1 tapered together, after the molded article to be the body portion 2 is molded with the mold, such a mold can be more easily removed from the molded article.

Furthermore, as illustrated in FIG. 6, even when the side surface 7a1 serving as the outer peripheral side of the body portion 2 is formed substantially perpendicular to the back surface 4, the mold in contact with the side surface 7a1 can be pulled out to the outer peripheral side of the molded article, so that the mold can be pulled out without any particular problem.

Figure 7:
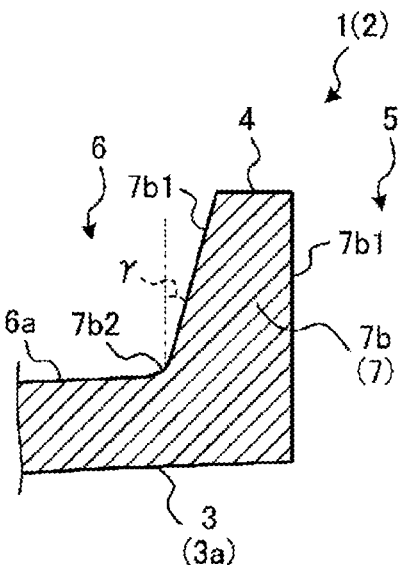
FIG. 7 is an enlarged cross-sectional view illustrating the configuration of an inner peripheral rib according to the embodiment.

FIG. 7 is an enlarged cross-sectional view illustrating the configuration of the inner peripheral rib 7b according to the embodiment. As illustrated in FIG. 7, such an inner peripheral rib 7b according to the embodiment has tapered side surfaces 7b1. Of the side surfaces 7b1 on both sides, a side surface 7b1 in contact with the recessed portion 6 is inclined with respect to the back surface 4 so that the inlet side of such a recessed portion 6 is widened.

An inclination angle γ of such a side surface 7b1 is in the range of, for example, 1° to 5°, and is preferably is in the range of 2° to 3°.

In the embodiment, the inner peripheral rib 7b has the tapered side surfaces 7b1, so that the molded article to be fired later to become the body portion 2 is molded with the mold, and then the mold can be easily removed from the molded article, in the manufacturing process of the mirror 1.

Consequently, according to the embodiment, the molded article to be the body portion 2 can be easily molded with the mold, so that the mirror 1 can be easily manufactured. Furthermore, in the embodiment, a distal end side of the inner peripheral rib 7b can be thinned, so that the mirror 1 can be reduced in weight.

As illustrated in FIG. 7, in the inner peripheral rib 7b, only a side surface 7b1 in contact with the recessed portion 6 is preferably tapered. In this way, even when a side surface 7b1 in contact with the through hole 5 is formed substantially perpendicular to the back surface 4, the mold in contact with such a side surface 7b1 is pulled out along the axial direction of the through hole, so that the mold can be pulled out without any particular problem.

Furthermore, in the embodiment, it is preferable that the corner portion 7b2 located at a lower end of the inner peripheral rib 7b has an R shape. Such a corner portion 7b2 is a portion where the side surface 7b1 of the inner peripheral rib 7b and the bottom surface 6a of the recessed portion 6 are in contact with each other.

In this way, since the corner portion 7b2 of the inner peripheral rib 7b has an R shape, stress can be suppressed from being concentrated on such a corner portion 7b2, so that the strength in the vicinity of the inner peripheral rib 7b in the body portion 2 can be improved.

Furthermore, in the embodiment, a width of the outer peripheral rib 7a is preferably wider than that of the inner peripheral rib 7b and that of the connection rib 7c. This can further improve the strength of the mirror 1.

Figure 8:
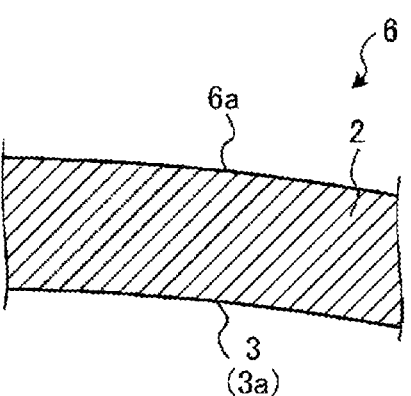
FIG. 8 is an enlarged cross-sectional view illustrating the configuration of a bottom surface of a recessed portion according to the embodiment.

Subsequently, details of components other than the rib 7 according to the embodiment will be described with reference to FIG. 8 to FIG. 11. FIG. 8 is an enlarged cross-sectional view illustrating the configuration of the bottom surface 6a of the recessed portion 6 according to the embodiment.

As illustrated in FIG. 8, the bottom surface 6a of the recessed portion 6 according to the embodiment is preferably a curved surface along the shape of the mirror surface 3a. In this way, the mirror 1 can be reduced in weight by making a wall thickness between the mirror surface 3a and the bottom surface 6a constant.

Figure 9:
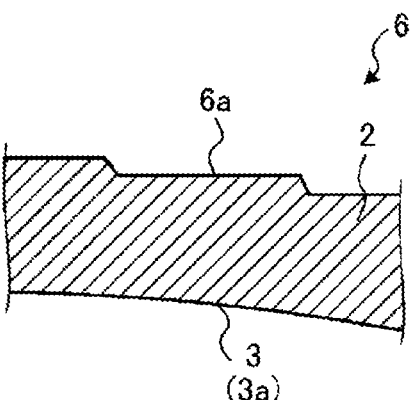
FIG. 9 is an enlarged cross-sectional view illustrating another configuration of a bottom surface of a recessed portion according to the embodiment.

The bottom surface 6a of the recessed portion 6 according to the embodiment is not limited to the curved surface along the shape of the mirror surface 3a. FIG. 9 is an enlarged cross-sectional view illustrating another configuration of the bottom surface 6a of the recessed portion 6 according to the embodiment.

As illustrated in FIG. 9, the bottom surface 6a of the recessed portion 6 according to the embodiment may in a stepped shape along the shape of the mirror surface 3a. In this way, by configuring the bottom surface 6a in a stepped shape including a plurality of flat surfaces, the mold can be easily formed as compared with a case where the bottom surface 6a includes many curved surfaces, so that the manufacturing cost of the mirror 1 can be reduced.

FIG. 9 illustrates an example in which a stepped portion that connects the flat surfaces of the bottom surface 6a has a taper, but since such a stepped portion has a small step difference of about 1 mm, it does not necessarily have to have a taper.

Figure 10:
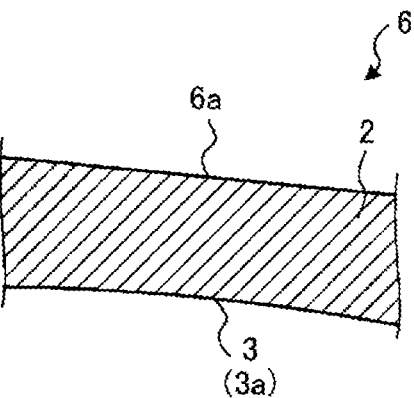
FIG. 10 is an enlarged cross-sectional view illustrating another configuration of a bottom surface of a recessed portion according to the embodiment.

FIG. 10 is an enlarged cross-sectional view illustrating another configuration of the bottom surface 6a of the recessed portion 6 according to the embodiment. As illustrated in FIG. 10, the bottom surface 6a of the recessed portion 6 according to the embodiment may be a flat surface along the shape of the mirror surface 3a.

In this way, by configuring the bottom surface 6a with one flat surface, the mold can be easily formed as compared with the case where the bottom surface 6a includes many curved surfaces, so that the manufacturing cost of the mirror 1 can be reduced. Furthermore, in the example of FIG. 10, the wall thickness between the mirror surface 3a and the bottom surface 6a can be made as thin as possible, so that the mirror 1 can be further reduced in weight.

Figure 11:
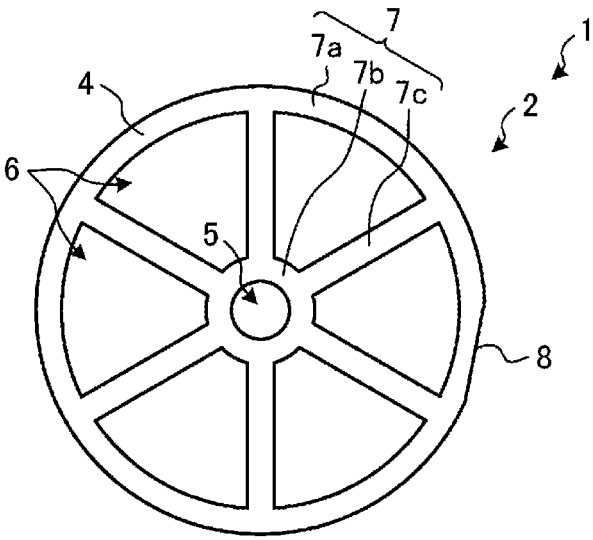
FIG. 11 is a plan view illustrating another configuration of a body portion according to the embodiment.

FIG. 11 is a plan view illustrating another configuration of the body portion 2 according to the embodiment. As illustrated in FIG. 11, the body portion 2 may have a flat portion 8 on a part of the side surface on the outer peripheral side thereof. In this way, the flat portion 8 is provided to a part of the side surface in the body portion 2, so that positioning can be facilitated in the process of processing the body portion 2.

Consequently, according to the embodiment, the dimensional accuracy of the body portion 2 can be improved. Furthermore, the flat portion 8 is provided to a part of the side surface in the body portion 2, so that positioning can be facilitated when the mirror 1 is installed in an astronomical telescope.

As the ceramics constituting the body portion 2, for example, cordierite ceramics, aluminum oxide ceramics, zirconium oxide ceramics, silicon nitride ceramics, aluminum nitride ceramics, silicon carbide ceramics, mullite ceramics, and the like can be used.

The body portion 2 is made of ceramics, so that the mirror 1 having high mechanical strength and excellent heat resistance can be implemented. Particularly, the body portion 2 is made of cordierite ceramics having a low specific gravity and a low thermal expansion rate, so that the mirror 1 can be reduced in weight and reliability can be improved under an environment where the temperature changes drastically.

The cordierite ceramics contains 80 mass % of cordierite ($2MgO \cdot 2Al_2O_3 \cdot 5SiO_2$) out of 100 mass % of all components constituting the ceramics.

The material of the body portion 2 may be confirmed by the following method. First, x-ray diffraction measurement is performed in the range of a diffraction angle $2\theta = (8°$ to $100°)$ by an X-ray diffraction (XRD) device using Cu-K$\alpha$ rays.

When the content of the cordierite calculated using a Rietveld analysis program RIETAN is 80 mass % or more, the material of the body portion 2 can be regarded as cordierite ceramics.

Manufacturing Process of Mirror

Subsequently, a manufacturing process of the mirror 1 according to the embodiment will be described. In the following description, a case where the body portion 2 is made of cordierite ceramics will be described.

First, synthetic cordierite powder, which is obtained by calcining and synthesizing mixed powder obtained by blending magnesium carbonate powder, aluminum oxide powder, and silicon oxide powder at a predetermined ratio, is prepared.

Next, the obtained synthetic cordierite powder and sintering aid powder are weighed at a predetermined ratio and used as primary raw materials. Next, the obtained primary raw material powders are wet-mixed, and then a predetermined amount of binder is added to obtain a slurry.

Next, the obtained slurry is poured into a mold processed into a predetermined shape in advance, is dried at a predetermined temperature and time to be solidified, and then is molded by a cast molding method or the like for demolding. Moreover, machine-cutting and the like are performed to obtain a molded article having any shape.

Next, the obtained molded article is fired in a firing furnace at a maximum temperature of 1,300° C. or higher and 1,450° C. or less in an air atmosphere, so that a fired body is obtained. Thereafter, grinding, polishing, coating, and the like are performed on the fired body as necessary, so that the body portion 2 according to the embodiment can be obtained.

First Modification

Figure 12:
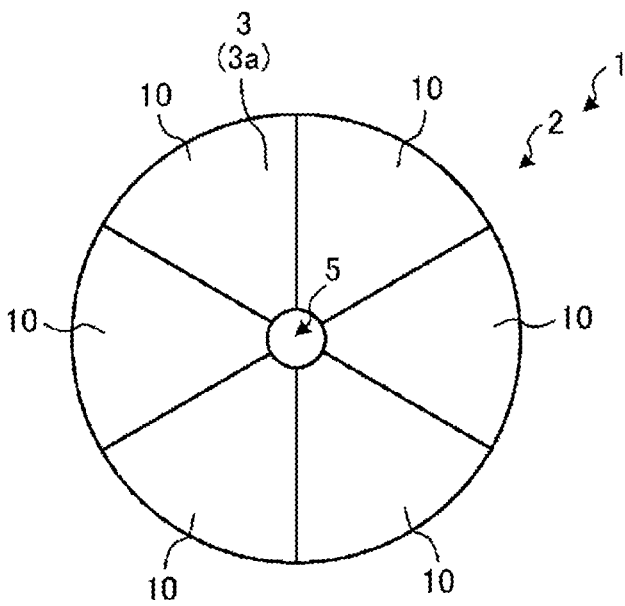
FIG. 12 is a plan view of a mirror according to a first modification of the embodiment when viewed from a front surface side.
Figure 13:
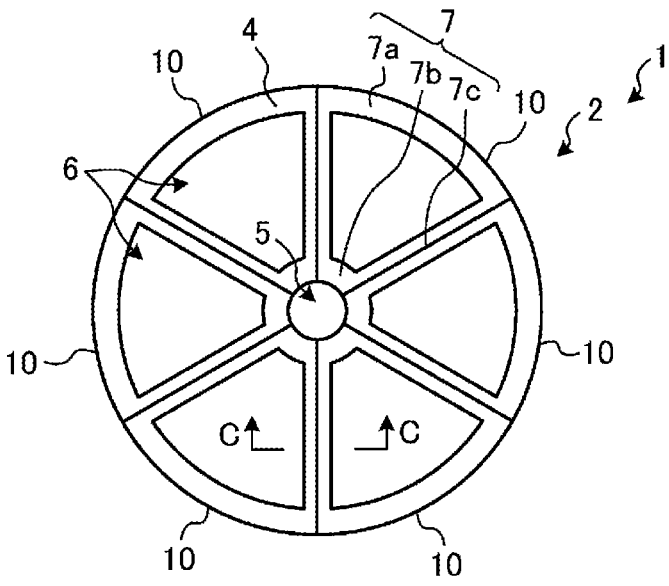
FIG. 13 is a plan view of the mirror according to the first modification of the embodiment when viewed from a back surface side.
Figure 14:
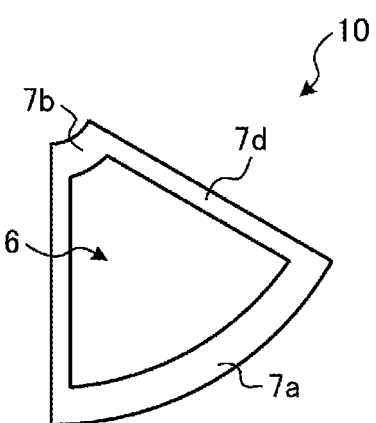
FIG. 14 is a plan view of a split member according to the first modification of the embodiment when viewed from a back surface side.

Subsequently, a first modification of the mirror 1 according to the embodiment will be described with reference to FIG. 12 to FIG. 18. FIG. 12 is a plan view of a mirror 1 according to the first modification of the embodiment when viewed from the front surface 3 side, FIG. 13 is a plan view of the mirror 1 according to the first modification of the embodiment when viewed from the back surface 4 side, and FIG. 14 is a plan view of a split member 10 according to the first modification of the embodiment when viewed from the back surface 4 side.

As illustrated in FIG. 12 and the like, the mirror 1 according to the first modification is different from the embodiment in that an overall shape is the same as that of the mirror 1 according to the embodiment, but a plurality of split members 10 having the same shape are connected to configure the body portion 2.

For example, six split members 10 (see FIG. 14) having a fan shape with a central angle of 60° in the plan view can be connected to configure the body portion 2 of the first modification.

In this way, the body portion 2 is configured by connecting the plurality of split members 10 having the same shape, so that the mirror 1 can be easily increased in size. Furthermore, since the body portion 2 is configured by connecting the plurality of split members 10 having the same shape, even when a part of the mirror 1 is damaged, only the damaged portion can be replaced.

As illustrated in FIG. 14, the recessed portion 6 is formed in the center portion of such a split member 10, and the outer peripheral rib 7a, the inner peripheral rib 7b, and a partial rib 7d (corresponding to a part of the connection rib 7c) are formed along the edge of the recessed portion 6, so that the mirror 1 having the configuration shown in the aforementioned embodiment can be implemented.

Figure 15:
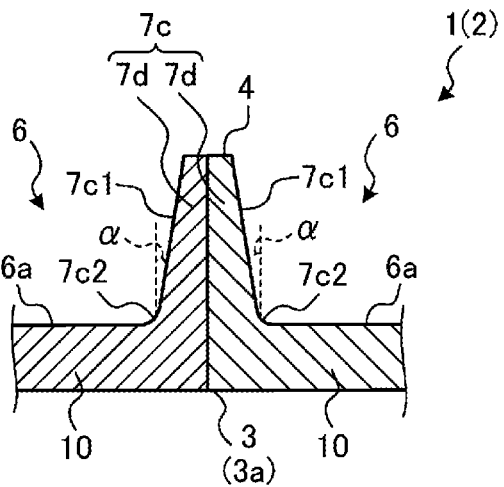
FIG. 15 is a cross-sectional view taken along line C-C in a direction of arrows illustrated in FIG. 13.

FIG. 15 is a cross-sectional view taken along line C-C in a direction of arrows in FIG. 13, and is an enlarged cross-sectional view illustrating the configuration of the connection rib 7c according to the first modification. As illustrated in FIG. 15, the connection rib 7c according to the first modification is configured by connecting the partial ribs 7d of the split members 10.

The connection rib 7c according to the first modification has the tapered side surface 7c1 as in the aforementioned embodiment. Since the configurations of the outer peripheral rib 7a and the inner peripheral rib 7b in the mirror 1 of first modification are the same as those of the aforementioned embodiment, description thereof will be omitted.

In the first modification, the connection rib 7c has the tapered side surface 7c1, so that a molded article to be fired later to become the split member 10 is molded with a mold, and then the mold can be easily removed from the molded article in the manufacturing process of the mirror 1.

Consequently, according to the first modification, the molded article to be the split member 10 can be easily molded with the mold, so that the mirror 1 can be easily manufactured. Furthermore, in the first modification, a distal end side of the connection rib 7c can be thinned, so that the mirror 1 can be reduced in weight.

In the first modification, the plurality of split members 10 can be connected by adhering contact surfaces, where the split members 10 are in contact with each other, by a bonding material or the like.

Figure 16:
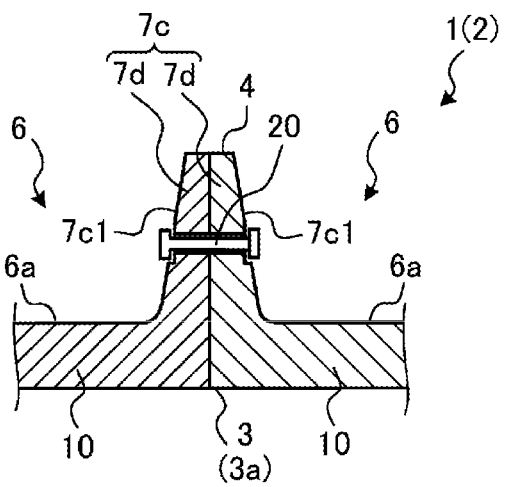
FIG. 16 is an enlarged cross-sectional view illustrating another configuration of a connection rib according to the first modification of the embodiment.

Furthermore, as illustrated in FIG. 16, fastening members 20 such as bolts and nuts may be used to connect adjacent split members 10. FIG. 16 is an enlarged cross-sectional view illustrating another configuration of the connection rib 7c according to the first modification of the embodiment.

Specifically, through holes extending through the partial rib 7d of the split member 10 in the horizontal direction are formed, the through holes of adjacent partial ribs 7d are communicated with each other, and the fastening members 20 are inserted into the communicating through holes, so that the adjacent split members 10 can be connected together.

In this way, since the plurality of split members 10 are connected by using the fastening members 20, even when vibration or the like is applied when the mirror 1 is attached to an astronomical telescope, heights of the front surfaces 3 of adjacent split members 10 can be suppressed from being shifted. Consequently, according to the example of FIG. 16, the surface accuracy of the mirror 1 can be improved.

In the example of FIG. 16, it is preferable that a flat surface substantially perpendicular to the axial direction of the through hole is formed around the through hole 5 on the side surface 7c1 of the partial rib 7d. When the fastening member 20 is brought into direct contact with the side surface 7c1 having a taper without forming such a flat surface, a great stress is applied to a part of the side surface 7c1 inclined from the fastening members 20, which may damage the partial rib 7d when fastening.

However, in the example of FIG. 16, since a flat surface substantially perpendicular to the axial direction of the through hole is formed around the through hole 5 on the side surface 7c1, stress is evenly applied to such a flat surface from the fastening members 20, so that the partial rib 7d can be suppressed from being damaged when fastening.

Furthermore, in the first modification, it is preferable that the arithmetic average roughness Ra of the contact surface, where the split members 10 are in contact with each other, is 0.8 μm or less and the flatness per unit length is 5 μm or less. Accordingly, a contact between adjacent split members 10 is good, so that a gap between the front surfaces 3 of the adjacent split members 10 can be reduced.

Consequently, according to the first modification, the surface accuracy of the mirror surface 3a configured by a set of the front surfaces 3 of the split members 10 can be improved.

Figure 17:
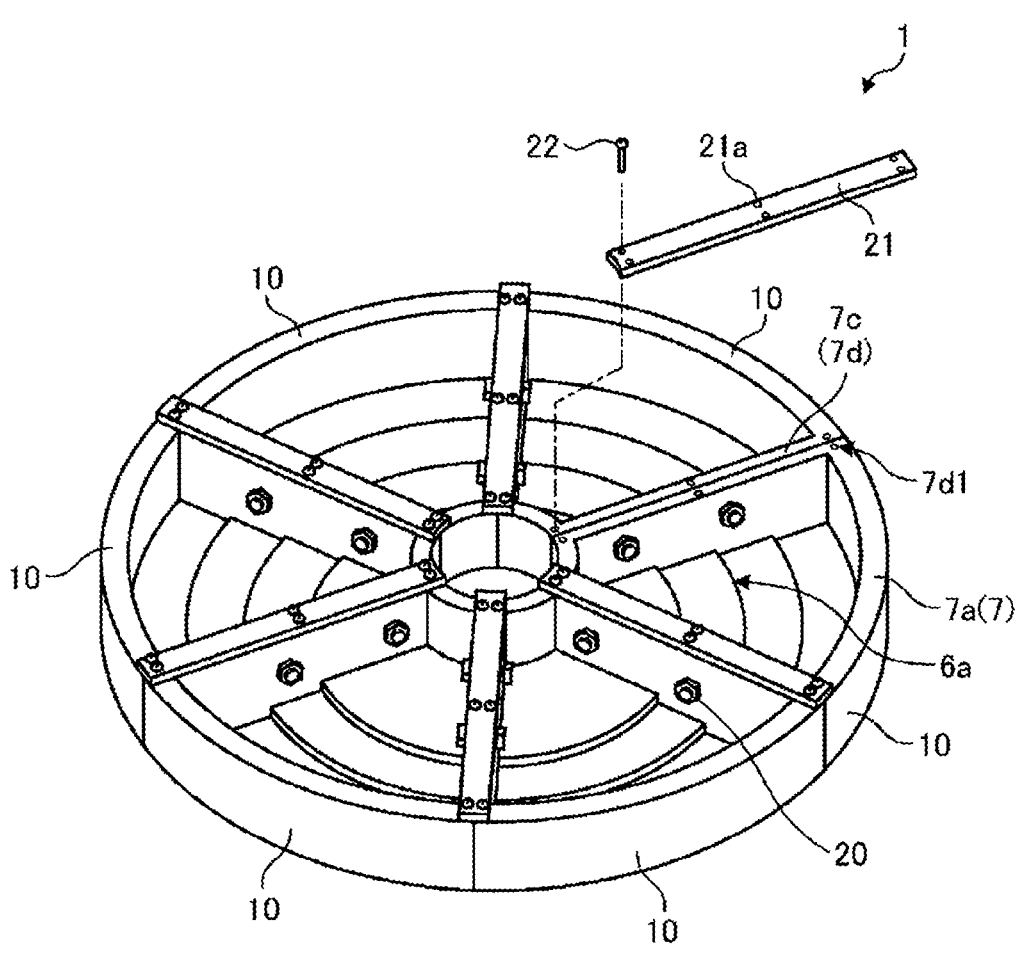
FIG. 17 is a perspective view illustrating another configuration of a body portion according to the first modification of the embodiment.

Furthermore, a member for bonding adjacent split members 10 is not limited to the fastening member 20. FIG. 17 is a perspective view illustrating another configuration of the body portion 2 according to the first modification of the embodiment.

As illustrated in FIG. 17, adjacent split members 10 may be connected via a plate-shaped member 21 disposed to cover the partial rib 7d. A plurality of through holes 21a are formed in such a plate-shaped member 21, and screw holes 7d1 are formed on a surface of the partial rib 7d on the back face 4 side at positions corresponding to such through holes 21a.

The plate-shaped member 21 is disposed to cover adjacent partial ribs 7d, and bolts 22 are screwed into the through holes 21a and the screw holes 7d1, so that the adjacent split members 10 can be connected via the plate-shaped member 21.

In this way, since the plurality of split members 10 are connected by using the plate-shaped members 21, even when vibration or the like is applied when the mirror 1 is attached to an astronomical telescope, heights of the front surfaces 3 of adjacent split members 10 can be suppressed from being shifted. Consequently, according to the example of FIG. 17, the surface accuracy of the mirror 1 can be improved.

FIG. 17 illustrates an example in which the plurality of split members 10 are connected by using the plate-shaped member 21 and the fastening members 20, but the plurality of split members 10 may be connected by using only the plate-shaped member 21 without using the fastening members 20.

Figure 18:
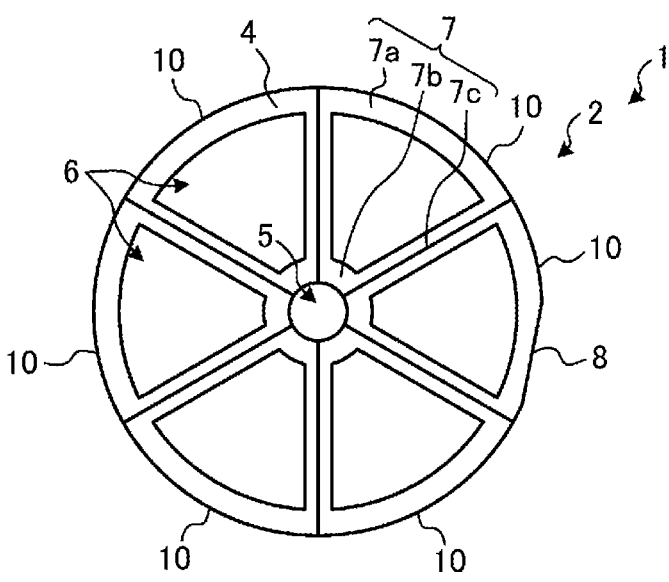
FIG. 18 is a plan view illustrating another configuration of a body portion according to the first modification of the embodiment.

FIG. 18 is a plan view illustrating another configuration of the body portion 2 according to the first modification of the embodiment. As illustrated in FIG. 18, the body portion 2 of the first modification may have a flat portion 8 on a part of the side surface on the outer peripheral side thereof. In this way, the flat portion 8 is provided to a part of the side surface in the body portion 2, so that positioning can be facilitated in the process of processing the body portion 2.

Consequently, according to the first modification, the dimensional accuracy of the body portion 2 can be improved. Furthermore, the flat portion 8 is provided to a part of the side surface in the body portion 2, so that positioning can be facilitated when the mirror 1 is installed in an astronomical telescope.

Second Modification

Figure 19:
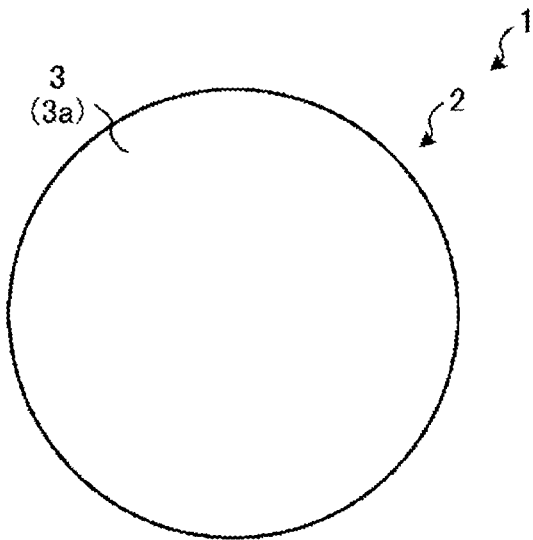
FIG. 19 is a plan view of a mirror according to a second modification of the embodiment when viewed from a front surface side.
Figure 20:
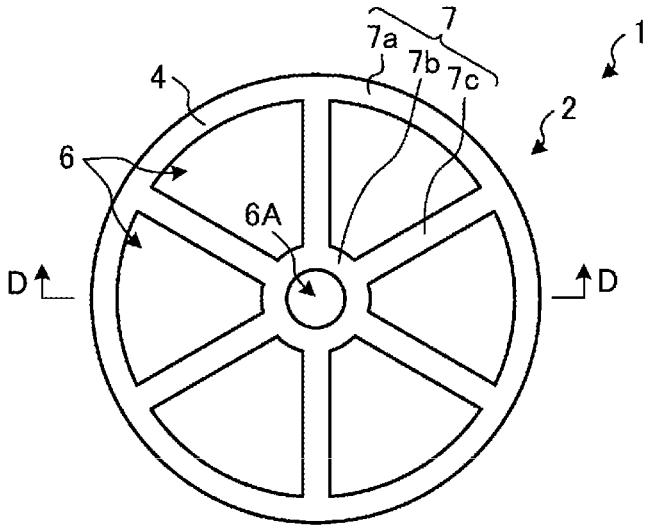
FIG. 20 is a plan view of a mirror according to the second modification of the embodiment when viewed from a back surface side.
Figure 21:
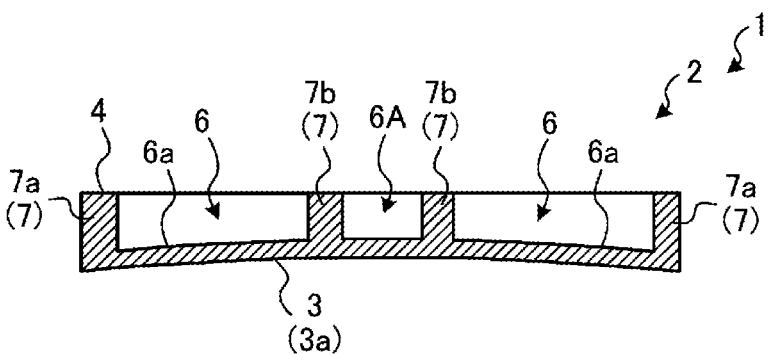
FIG. 21 is a cross-sectional view taken along line D-D in a direction of arrows illustrated in FIG. 20.

Subsequently, a second modification of the mirror 1 according to the embodiment will be described with reference to FIG. 19 to FIG. 22. FIG. 19 is a plan view of the mirror 1 according to the second modification of the embodiment when viewed from the front side 3 side, FIG. 20 is a plan view of the mirror 1 according to the second modification of the embodiment when viewed from the back surface 4 side, and FIG. 21 is a cross-sectional view taken along the line D-D in a direction of arrows in FIG. 20.

As illustrated in FIG. 19 and the like, the mirror 1 according to the second modification is different from the embodiment in that a recessed portion 6A is formed in the center portion of the body portion 2 instead of the through hole 5. In this way, since the through hole 5 is not formed, an area of the mirror surface 3a can be enlarged, so that the amount of light reflected from an observation target can be increased.

Figure 22:
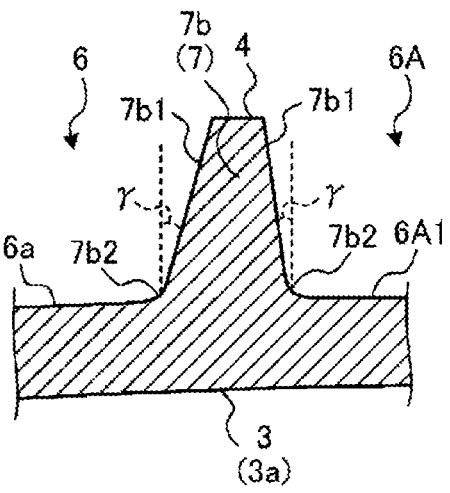
FIG. 22 is an enlarged cross-sectional view illustrating the configuration of an inner peripheral rib according to the second modification of the embodiment.

FIG. 22 is an enlarged cross-sectional view illustrating the configuration of the inner peripheral rib 7b according to the second modification of the embodiment. As illustrated in FIG. 22, the inner peripheral rib 7b according to the second modification has the tapered side surface 7b1.

The side surface 7b1 is inclined with respect to the back surface 4 so that an inlet side of recessed portions 6 and 6A in contact with each other is widened. An inclination angle γ of the side surface 7b1 is in the range of, for example, 1° to 5°, and is preferably in the range of 2° to 3°.

In the second modification, the inner peripheral rib 7b has the tapered side surface 7b1, so that a molded article to be fired later to become the body portion 2 is molded with a mold, and then the mold can be easily removed from the molded article in the manufacturing process of the mirror 1.

Consequently, according to the second modification, the molded article to be the body portion 2 can be easily molded with the mold, so that the mirror 1 can be easily manufactured. Furthermore, in the second modification, a distal end side of the inner peripheral rib 7b can be thinned, so that the mirror 1 can be reduced in weight.

Furthermore, in the embodiment, it is preferable that the corner portion 7b2 located at a lower end of the inner peripheral rib 7b has an R shape. Such a corner portion 7b2 is a portion where the side surface 7b1 of the inner peripheral rib 7b and the bottom surface 6a of the recessed portion 6 or a bottom surface 6A1 of the recessed portion 6A are in contact with each other.

In this way, since the corner portion 7b2 of the inner peripheral rib 7b has an R shape, stress can be suppressed from being concentrated on the corner portion 7b2, so that the strength in the vicinity of the inner peripheral rib 7b in the body portion 2 can be improved.

As illustrated in FIG. 22, in the inner peripheral rib 7b of the second modification, the side surfaces 7b1 on both sides may be tapered together. Accordingly, after the molded article to be the body portion 2 is molded with the mold, the mold can be more easily removed from the molded article.

Embodiments according to the present invention were described above. However, the present invention is not limited to the embodiments described above, and various modifications can be made without departing from the essential spirit of the present invention. For example, in the aforementioned embodiment, the mirror 1 having a disk shape has been described; however, the shape of the mirror 1 is not limited to the disk shape and can be appropriately changed according to the specifications of various devices to which the mirror 1 is applied.

Furthermore, in the aforementioned embodiment, an example in which the body portion 2 is configured by connecting six split members 10 has been described; however, the number of split members 10 constituting the body portion 2 is not limited to six.

As described above, the mirror 1 according to the embodiment includes a mirror surface 3*a* provided on a front surface 3 of a plate-shaped body portion 2 made of ceramics, recessed portions 6 formed on a back surface 4 of the body portion 2, and a rib 7 (an outer peripheral rib 7*a*, an inner peripheral rib 7*b*, and a connection rib 7*c*) provided along edges of the recessed portions 6 and including tapered side surfaces 7*a*1, 7*b*1, and 7*c*1. This makes it possible to easily manufacture the mirror 1.

Furthermore, in the mirror 1 according to the embodiment, the mirror surface 3*a* is a curved surface, and the bottom surface 6*a* of the recessed portion 6 is a curved surface along the shape of the mirror surface 3*a*. This makes it possible to reduce the weight of the mirror 1.

Furthermore, in the mirror 1 according to the embodiment, the mirror surface 3*a* is a curved surface, and the bottom surface 6*a* of the recessed portion 6 is in a stepped shape along the shape of the mirror surface 3*a*. This makes it possible to reduce the manufacturing cost of the mirror 1.

Furthermore, in the mirror 1 according to the embodiment, the mirror surface 3*a* is a curved surface, and the bottom surface 6*a* of the recessed portion 6 is a flat surface along the shape of the mirror surface 3*a*. This makes it possible to reduce the manufacturing cost of the mirror 1, and to further reduce the weight of the mirror 1.

Furthermore, in the mirror 1 according to the embodiment, the rib 7 includes the outer peripheral rib 7*a* provided on the outer peripheral side of the back surface 4, the inner peripheral rib 7*b* provided on the inner peripheral side of the back surface 4, and the connection rib 7*c* provided to connect the outer peripheral rib 7*a* and the inner peripheral rib 7*b*. The width of the outer peripheral rib 7*a* is wider than that of the inner peripheral rib 7*b* and that of the connection rib 7*c*. This makes it possible to further improve the strength of the mirror 1.

Furthermore, in the mirror 1 according to the embodiment, the body portion 2 has a disk shape, and has a flat portion 8 on a part of the side surface on the outer peripheral side. Accordingly, the dimensional accuracy of the body portion 2 can be improved, and positioning can be facilitated when the mirror 1 is installed in an astronomical telescope.

Furthermore, in the mirror 1 according to the embodiment, the body portion 2 is configured by connecting the plurality of split members 10 having the same shape. Accordingly, the mirror 1 can be easily increased in size, and even when a part of the mirror 1 is damaged, only the damaged portion can be replaced.

Furthermore, in the mirror 1 according to the embodiment, adjacent split members 10 are connected by the fastening members 20 that penetrate through a part (partial rib 7*d*) of the rib (connection rib 7*c*). This makes it possible to improve the surface accuracy of the mirror 1.

Furthermore, in the mirror 1 according to the embodiment, adjacent split members 10 are connected via the plate-shaped member 21 disposed to cover a part (partial rib 7*d*) of the rib (connection rib 7*c*). This makes it possible to improve the surface accuracy of the mirror 1.

Additional effects and other aspects can be easily derived by a person skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

REFERENCE SIGNS LIST

1 Mirror
2 Body portion

3 Front surface
3*a* Mirror surface
4 Back surface
5 Through hole
6 Recessed portion
6*a* Bottom surface
7 Rib
7*a* Outer peripheral rib
7*b* Inner peripheral rib
7*c* Connection rib
7*d* Partial rib
7*a*1 to 7*c*1 Side surface
8 Flat portion
10 Split member
20 Fastening member
21 Plate-shaped member

The invention claimed is:

1. A mirror comprising:
a mirror surface having body portion with a front surface and a back surface, a plate shape, and made of ceramics, wherein
the back surface includes a widened inlet, a recessed portion with an edge, and a rib provided along the edge of the recessed portion and comprising a tapered side surface that decreases in tapered width, terminating in the widened inlet,
the widened inlet gradually widens as the tapered side surface decreases in tapered width.

2. The mirror according to claim 1, wherein
the mirror surface is a curved surface, and
a bottom surface of the recessed portion is a curved surface along a shape of the mirror surface.

3. The mirror according to claim 1, wherein
the mirror surface is a curved surface, and
a bottom surface of the recessed portion has a stepped shape along a shape of the mirror surface.

4. The mirror according to claim 1, wherein
the mirror surface is a curved surface, and
a bottom surface of the recessed portion is a flat surface along a shape of the mirror surface.

5. The mirror according to claim 1, wherein
the rib comprises an outer peripheral rib provided on an outer peripheral side of the back surface, an inner peripheral rib provided on an inner peripheral side of the back surface, and a connection rib provided to connect the outer peripheral rib and the inner peripheral rib, and
a width of the outer peripheral rib is wider than a width of the inner peripheral rib and a width of the connection rib.

6. The mirror according to claim 1, wherein the body portion has a disk shape, and comprises a flat portion on a part of a side surface on an outer peripheral side of the body portion.

7. The mirror according to claim 1, wherein the body portion is configured by connecting a plurality of split members having the same shape.

8. The mirror according to claim 7, wherein the split members adjacent to each other are connected by a fastening member that penetrates through a part of the rib.

9. The mirror according to claim 7, wherein the split members adjacent to each other are connected via a plate-shaped member disposed to cover a part of the rib.

* * * * *